United States Patent [19]

Gehlen et al.

[11] 4,316,530

[45] Feb. 23, 1982

[54] FLOATING CALIPER DISC BRAKE

[75] Inventors: Jakob Gehlen; Hans Wortmann, both of Bad Soden, Fed. Rep. of Germany

[73] Assignee: ITT Industries, Inc., New York, N.Y.

[21] Appl. No.: 226,310

[22] Filed: Jan. 19, 1981

Related U.S. Application Data

[63] Continuation of Ser. No. 67,572, Aug. 17, 1979, abandoned.

[30] Foreign Application Priority Data

Sep. 7, 1978 [DE] Fed. Rep. of Germany ....... 2838921

[51] Int. Cl.³ .................... F16D 55/224; F16D 65/02
[52] U.S. Cl. .............................. 188/73.39; 188/73.37; 188/264 G
[58] Field of Search ............... 188/71.1, 72.4, 73.3, 188/73.4, 73.5, 264 G

[56] References Cited

U.S. PATENT DOCUMENTS

| 3,166,159 | 1/1965 | Burnett | 188/73.3 |
|---|---|---|---|
| 3,435,927 | 4/1969 | Volker et al. | 188/264 G |
| 3,625,314 | 6/1969 | Rinker | 188/73.5 X |
| 3,831,717 | 8/1974 | Flaherty | 188/73.3 |
| 3,893,546 | 7/1975 | Kestermeier et al. | 188/73.3 |
| 4,044,864 | 8/1977 | Karasodani | 188/73.3 |
| 4,191,278 | 3/1980 | Karasodari | 188/73.3 |

FOREIGN PATENT DOCUMENTS

| 2031249 | 3/1974 | Fed. Rep. of Germany . | |
|---|---|---|---|
| 2506253 | 8/1976 | Fed. Rep. of Germany | 188/73.4 |
| 2636443 | 2/1977 | Fed. Rep. of Germany . | |
| 1510612 | 12/1967 | France | 188/73.3 |
| 1173698 | 12/1969 | United Kingdom | 188/73.5 |
| 1270364 | 4/1972 | United Kingdom | 188/73.5 |

Primary Examiner—George E. A. Halvosa
Attorney, Agent, or Firm—John T. O'Halloran; Alfred C. Hill

[57] ABSTRACT

The brake force occurring at the brake shoes are distributed such that part of the brake force is transmitted via the brake shoe holding arrangement to the brake support member and the other part of the force is transmitted through the floating caliper to the brake support member. For this purpose, the surface of the brake shoes close to the floating caliper is provided with a friction lining so that the coefficient of friction between the floating caliper and the brake shoes is 0.5 times smaller than the coefficient of friction between the brake shoe pads and the brake disc.

11 Claims, 4 Drawing Figures

FLOATING CALIPER DISC BRAKE

CROSS-REFERENCE TO RELATED APPLICATION

This is a continuation of application Ser. No. 067,572, filed Aug. 17, 1979, now abandoned.

BACKGROUND OF THE INVENTION

The present invention relates to a floating caliper disc brake, with a brake support member arranged on one side of the brake disc and including two arms, with a brake shoe guided and supported on the arms, and with a brake caliper carried and guided on the brake support member and arranged to frictionally engage the brake shoe.

In a known disc brake (German Pat. No. DT-OS 2,636,443) one brake shoe is guided and carried between two supporting surfaces of the brake support member by means of two pins secured to the brake caliper, while the other brake shoe is formed fast with the brake caliper. The brake caliper possesses two guide bolts guided through two interference fits on the brake support member in such a manner that they are in positive engagement with the brake support member only towards the center of the brake. When the brake is actuated, the brake force occurring on that brake shoe that is in positive engagement with the brake caliper is transmitted, through the brake caliper and the guide bolts extending in the disc entry direction, to the arm of the brake support member extending in the disc entry direction, and the brake force occurring on the other brake shoe is transmitted through the supporting surface of the brake support member directly to the arm of the brake support member lying on the disc exit side.

While this arrangement ensures distribution of the total frictional force occurring to both arms of the brake support member under any load condition, one brake shoe transmits the frictional force acting on it always to only one arm of the brake support member. From this arrangement there results that one brake shoe is pushed while the other is pulled. As a consequence, the brake shoes are subject to force relationships favoring intense brake vibration and brake squeal. Moreover, the brake caliper and guide bolt constructions involve high expenditure of material because they are required to take up and transmit the entire frictional force acting on a brake shoe.

Another disc brake (German Pat. No. DT-AS 2,031,249) shows two Z-shaped members placed on the brake support member, guiding the brake caliper and supporting it if a load is applied. The inward brake shoe on the side close to the piston is disposed between the arms of the brake support member, and the outward brake shoe embraces the arms of the brake support member so that it is able to bear with its end against outward supporting surfaces of the arms of the brake support member, which surfaces are turned away from each other.

Thus, in the event of a load being applied, the brake shoes are always in frictional engagement with only one arm of the brake support member, and only after a deformation of the arm of the brake support member lying on the disc entry side occurs, which deformation is determined by the existing clearances, is the brake caliper clamped between its guides and constitutes a force-transmitting connection between the arms of the brake support member.

The disadvantage therein is that the distribution of force is dependent upon the manufacturing tolerances of the guides of the brake caliper and that a plurality of individual components are required. In addition, the distribution of force occurs only after the deformation of one brake support member arm and after clearances are overcome which differ for each brake. Even slightest dimensional tolerances affect the distribution of force to a great extent.

SUMMARY OF THE INVENTION

It is an object of the present invention to eliminate the afore-described disadvantages and provide a floating caliper disc brake wherein the frictional force at a brake shoe is transmitted directly to the arms of the brake support member at a predetermined ratio, irrespective of the load on the brake and manufacturing tolerances.

A feature of the present invention is the provision of a floating caliper disc brake comprising a brake disc having a main direction of rotation such that the disc enters the brake on an entry side thereof and leaves the brake on an exit side thereof; a brake support member disposed on one side of the disc, the support member having a first arm disposed on the entry side embracing the periphery of the disc and a second arm disposed on the exit side embracing the periphery of the disc; a brake caliper carried and guided on the support member and embracing the periphery of the disc, the caliper being in a positive and clearance-free engagement with one of the first and second arms; and a pair of brake shoes each disposed on opposite sides of the disc, at least one of the pair of shoes has a friction lining on the surface thereof remote from the disc to frictionally engage the caliper and to bear against the other of the first and second arms.

Thus, the distribution of force to both arms of the brake support member enables optimum use to be made of the material and, as a result of such balanced forces at the brake shoes, prevents intense brake vibration. In this arrangement, the distribution of force is largely independent of dimensional tolerances and can even be predetermined to any desired ratio by suitably choosing the coefficient of friction. Admittedly, the tolerances of the coefficient of friction will also affect the distribution of force, but this influence is not so weighty as that of dimensional tolerances.

Because the brake shoe which is in frictional engagement with the brake caliper lies on the side of the disc remote from the brake support member, the distribution of force to both arms of the brake support member is made use of advantageously. The arms of the brake support member extending over the brake disc require less material and, consequently, can be of less weight, because the forces acting on one arm are no longer high and the bending moments acting on the arms are reduced substantially.

Because the brake caliper bears against the rearward arm of the brake support member, when viewed in the main direction of rotation of the brake disc, and the brake shoe engages the forward arm of the brake support member, when viewed in the main direction of rotation, wedge-shaped wear of the pads and jamming of the brake caliper in its guidings is avoided.

The arrangement of a friction lining between brake shoe and brake caliper provides safe frictional engagement between these parts.

The necessity of providing additional manufacturing steps with regard to the disc brake is obviated by designing the brake shoe, which is composed of brake pad and backing plate, of a floating caliper disc brake of the invention such that the backing plate carries a friction lining on the side close to the brake caliper. The friction lining can be fitted at the same time the brake pad is fitted to the backing plate.

If, in choosing the friction lining, it is ensured that the coefficient of friction $\mu_r$ between brake caliper and brake shoe is smaller than the coefficient of friction $\mu_B$ between brake pad and brake disc, distribution of the brake forces to both arms of the brake support member is assured at all times.

If the coefficient of friction $\mu_r$ between brake caliper and brake shoe is so chosen that it is smaller than the coefficient of friction $\mu_B$ between brake pad and brake disc by a factor 0.5, then the brake force occuring on one brake shoe is distributed to both arms of the brake support member at the ratio 1 to 1, independently of the load.

By arranging the brake caliper so it has one surface thereof, on either side of the brake disc, in positive engagement with one arm of the brake support member in the main direction of rotation, the brake caliper is prevented from assuming an inclined position, and, thus, wedge-shaped wear of the brake pads is counteracted.

By designing the brake-caliper support so that the brake caliper, in the main direction of rotation, is in positive engagement with one arm of the brake support member only above the brake disc, the maximum amount of bending moment occurring is reduced and the arm of the brake support member can be manufactured with economy of material and costs.

The bending moment occurring is independent of pad wear by arranging for the brake caliper to bear against a projection provided on an arm of the brake support member.

In another embodiment of the present invention, that arm of the brake support member that is in positive engagement with the brake caliper is so designed that it extends only up to the outer edge of the brake disc, when viewed from the brake support member. The brake shoe lying on the side of the disc remote from the brake support member is suspended on the brake caliper in such a manner that it is slidable in the brake disc circumferential direction. This construction permits still further economy of material.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
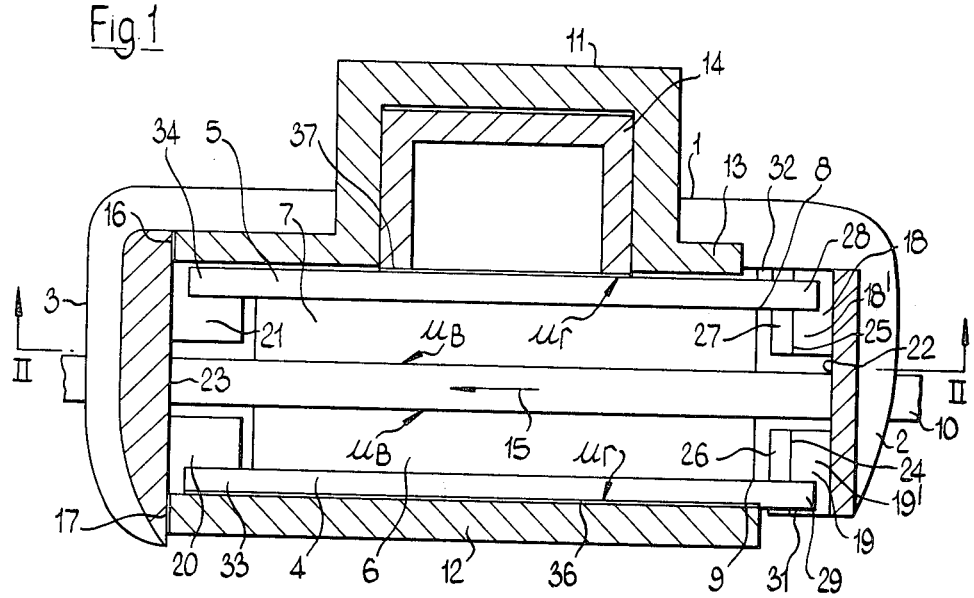
FIG. 1 is a top plan view of a floating caliper disc brake in accordance with the principles of the present invention, sectioned horizontally on the level of the arms of the brake support member.
Figure 2:
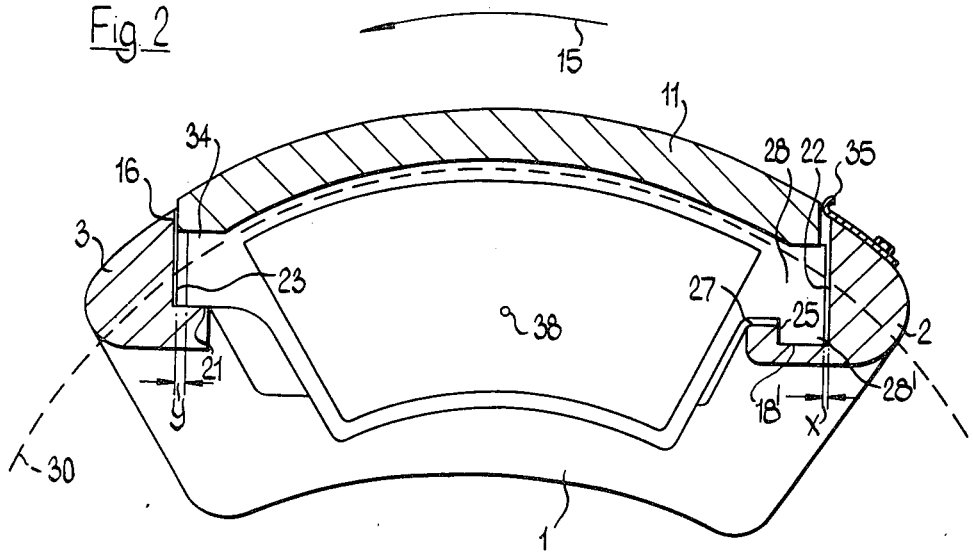
FIG. 2 is a section along the line II—II of FIG. 1.
Figure 3:
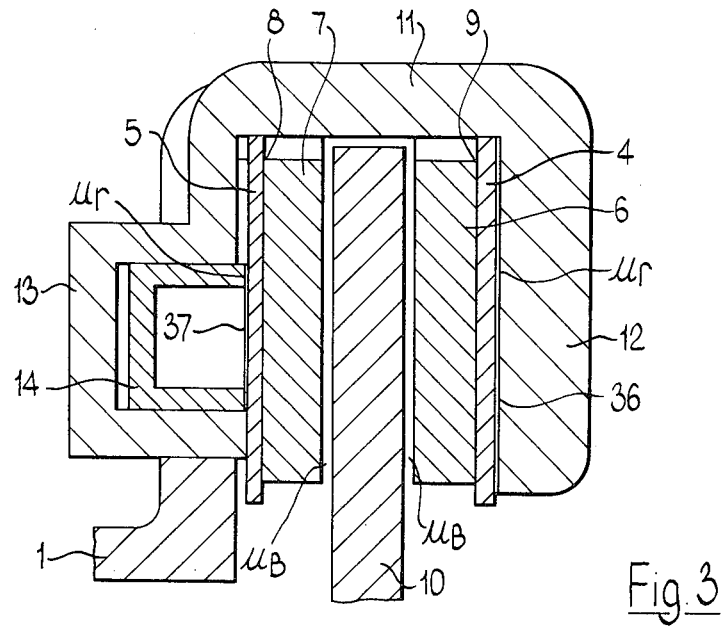
FIG. 3 is a center section of the floating caliper disc brake of FIG. 1 when viewed in the direction of rotation of the brake disc.

FIGS. 1, 2 and 3 illustrate an embodiment of a floating caliper disc brake in accordance with the principles of the present invention comprising a brake support member 1 mountable on a fixed part of a vehicle, brake shoes 8 and 9 arranged on both sides of brake disc 10, a brake caliper 11 fitting over the brake disc in the form of a U and embracing brake shoes 8 and 9, with brake caliper 11 being axially slidably mounted on brake support member 1 by means of two guide bolts, and an actuating cylinder 14 arranged between brake support member 1 and brake caliper 11 acting on brake shoe 8 directly, and on brake shoe 9 indirectly through brake caliper 11.

Brake support member 1 includes two spaced arms 2 and 3 arranged in the direction of a secant in relation to brake disc 10, with the arms fitting over the edge of brake disc 10 and serving as a guide and support for brake shoes 8 and 9. Arm 2 of brake support member 1 lying on the disc entry side includes two grooves 18 and 19 extending parallel to the disc axis and bounded by the wall surface 22 of brake support member arm 2, by the groove bottom surfaces 18' and 19' and by the wall surfaces 24 and 25 extending parallel to wall surface 22 and pointing towards the outer edge of brake disc 10. Wall surfaces 24 and 25 terminate within the outer periphery 30 of brake disc 10 at the surfaces 26 and 27. Arm 3 of brake support member 1 lying on the disc exit side has a wall surface 23 facing the brake center and perpendicular thereto are two abutment or supporting surfaces 20 and 21 extending towards the brake center.

Brake shoes 8 and 9 are composed of pads 6 and 7 and backing plates 4 and 5. Backing plates 4 and 5 carry a friction lining on the sides 31 and 32 thereof facing brake caliper 11, so that the coefficient of friction $\mu_r$ between the friction lining and brake caliper 11 is exactly 0.5 times smaller than the coefficient of friction $\mu_B$ between brake disc 10 and pads 6 and 7. On the disc entry side, the ends 28 and 29 of backing plates 4 and 5 include projections 28' and 29' pointing towards the center of disc 10, with projections 28' and 29' engaging grooves 18 and 19 with a clearance X relative to wall surface 22 and abutting groove bottom surfaces 18' and 19'. The ends 33 and 34 of backing plates 4 and 5 on the disc exit side are in abutment with supporting surfaces 20 and 21 so that they are able to receive a turn, in the direction of the disc center, about the point of abutment of projections 28' and 29' on the groove bottom surfaces 18' and 19'. The clearance Y between ends 33 and 34 of backing plates 4 and 5 and wall surface 23 of arm 3 of brake support member 1 is greater than clearance X.

A resilient member 35 secured to arm 2 of brake support member 1 keeps surfaces 16 and 17 of brake caliper 11 in abutment with wall surfaces 23 of arm 3 of brake support member 1. The leg 12 of brake caliper 11, which extends parallel to brake disc 10, has its surface 36 in direct frictional engagement with backing plate 4 of brake shoe 9 through the friction lining, and the leg 13 of brake caliper 11 has its surface 37 in indirect frictional engagement with the friction lining of backing plate 5 of brake shoe 8 through actuating cylinder 14.

The mode of operation of the floating caliper disc brake of the present invention shall now be explained with reference to FIGS. 1 and 2. Brake disc 10 is assumed to rotate in the direction indicated by arrow 15, which is defined as the main direction of rotation. The resultant forces occurring when brake shoes 8 and 9 engage brake disc 10 are substantially perpendicular to the diameter of brake disc 10, which diameter passes through point 38 in FIG. 2. Thus, the brake force will try to drag brake shoes 8 and 9 in the direction of rotation 15 of brake disc 10. The friction contact between brake shoes 8 and 9 and brake caliper 11 is overcome, the brake shoe backing plate ends 28 and 29, which are provided with projections 28' and 29', engage grooves 18 and 19 of arm 2 of brake support member 1 and transmit on wall surfaces 24 and 25 all those forces to brake support member arm 2 that exceed the friction contact, while the force transmitted by friction contact to brake caliper 11 via surfaces 16 and 17 is transferred to arm 3 of brake support member 1. Thus, the desired distribution of force is only dependent on the ratio between the coefficients of friction $\mu_r$ and $\mu_B$ and shall be explained briefly by a numerical example.

The coefficient of friction $\mu_B$ between pads 6 and 7 and brake disc 10 is assumed to be $\mu_B=0.5$, and the coefficient of friction $\mu_r$ between legs 12 and 13 of brake caliper 11 and brake shoe backing plates 4 and 5 is assumed to be $\mu_r=0.25$. Assuming an axial force urging brake shoes 8 and 9 into engagement with brake disc 10 of F=10,000 N (newton), a brake force $F_B=5,000$ N will occur between brake disc 10 and each of pads 6 and 7, which force tends to drag brake shoes 8 and 9 in the circumferential direction. However, to be able to move brake shoes 8 and 9 relative to brake caliper 11, the friction contact of $F_r=F\cdot\mu_r=10,000$ N·0.25=2,500 N has to be overcome first. Thus, the brake force occurring at brake shoes 8 and 9 is divided into a force overcoming the friction contact, which force is transmitted via brake caliper 11 to arm 3 of brake support member 1, and the remaining force $F_r'=F_B-F_r=2,500$ N, which force is transmitted, via projections 28' and 29', to arm 2 of brake support member 1. Thus, there results an even distribution of force to arms 2 and 3 of brake support member 1, which force is independent of the load condition occurring.

Figure 4:
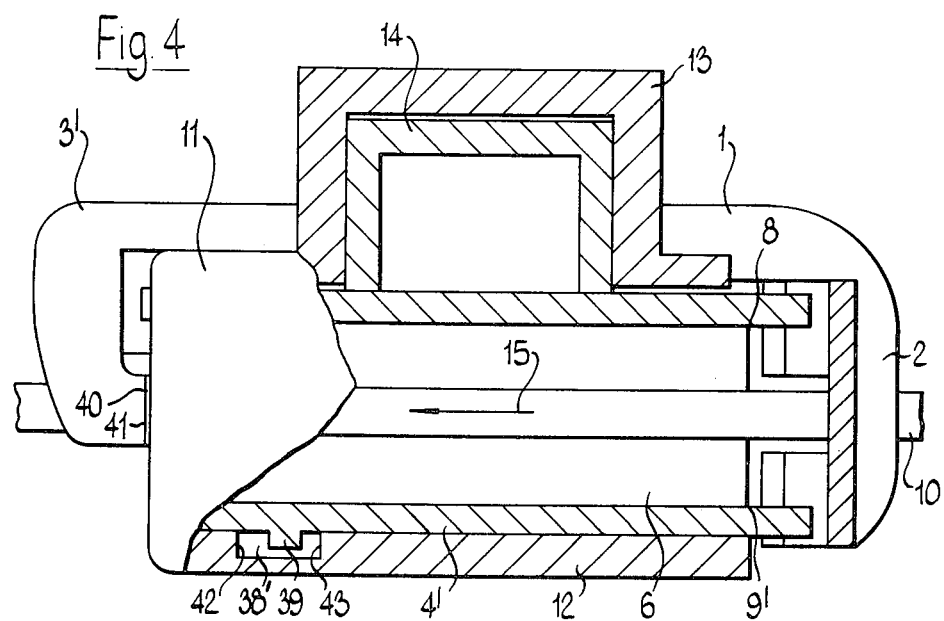
FIG. 4 is a top plan view of a modification of the floating caliper disc brake of FIG. 1.

FIG. 4 shows a top plan view of a modified floating caliper disc brake of the present invention. It differs from the brake shown in FIG. 1 by the modified arm 3' of brake support member 1, which arm extends only above brake disc 10 and has a projection 40 which points to the center of the brake and has its surface 41 in abutment with brake caliper 11. Backing plate 4' of brake shoe 9' includes a lug 39 pointing towards caliper leg 12 and engages a recess 38' of caliper leg 12 such that displacement of brake shoe 9' in both circumferential directions of brake disc 10 is only possible within clearance X, without lug 39 abutting the wall surfaces 42 and 43, respectively. This modification does not affect the mode of operation of the disc brake conditioned by the friction contact. In contrast to FIG. 1, the point of application of the force on arm 3' of brake support member 1 is independent of pad wear. The point of application of force lies always above the disc, and the bending moment depends solely on the resultant brake force.

While we have described above the principles of our invention in accordance with specific apparatus it is to be clearly understood that this description is made only by way of example and not as a limitation to the scope of our invention as set forth in the objects thereof and in the accompanying claims.

We claim:

1. A floating caliper disc brake comprising:

a brake disc having a main direction of rotation about a rotational axis such that said disc enters said brake on an entry side thereof and leaves said brake on an exit side thereof;

a brake support member disposed on one side of said disc, said support member having a first arm disposed on said entry side embracing the periphery of said disc and a second arm disposed on said exit side embracing the periphery of said disc; said first arm including at least a first groove disposed adjacent a selected side of said disc extending parallel to said axis formed by a first surface extending vertically parallel to said axis, a second surface disposed on said selected side of said disc perpendicular to said first surface extending from said first surface toward the center of said disc and a third surface disposed on said selected side of said disc perpendicular to said second surface extending from said second surface, spaced from and facing said first surface and extending parallel to said first surface and said second arm including a fourth surface disposed on said selected side of said disc extending vertically parallel to and facing said first surface and a fifth surface disposed on said selected side of said disc perpendicular to said fourth surface extending from said fourth surface toward the center of said disc;

a brake caliper carried and guided on said support member and embracing the periphery of said disc, said caliper being in a positive direct engagement with said second arm and spaced from said first surface in an inoperative position of said brake; and a pair of brake shoes each disposed on opposite sides of said disc, at least one of said pair of shoes having a first friction lining on the surface thereof remote from said disc to frictionally engage said caliper and said one of said pair of shoes is disposed on said selected side of said disc having an inwardly directed first projection on an end thereof adjacent said first arm engaging said first groove in an abutting relationship with said third surface and spaced from said first surface a first predetermined distance and the other end of said one of said pair of shoes being in an abutting relationship with said fifth surface and spaced from said fourth surface a second predetermined distance in said inoperative position of said brake.

2. A disc brake according to claim 1, wherein said selected side of said disc is remote from said support member.

3. A disc brake according to claim 2, wherein the other of said pair of shoes has a second friction lining on the surface thereof remote from said disc to provide a frictional engagement between said caliper and said other of said pair of shoes.

4. A disc brake according to claim 1, wherein each of said brake shoes include
   a backing plate,
   a brake pad on one surface of said backing plate adjacent said disc, and
   a friction lining on the other surface of said backing plate adjacent said caliper.

5. A disc brake according to claim 4, wherein the coefficient of friction between said caliper and said friction linings is smaller than the coefficient of friction between said brake pads and said disc.

6. A disc brake according to claim 4, wherein the coefficient of friction between said caliper and said friction linings is smaller than the coefficient of friction between said brake pads and said disc by a factor of 0.5.

7. A disc brake according to claim 1, wherein
said caliper includes
a first surface disposed on said selected side of said disc in positive engagement with said fourth surface, and
a second surface disposed on the other side of said disc in positive engagement with said fourth surface.

8. A disc brake according to claim 1, wherein
said caliper is in positive engagement with said second arm only above the periphery of said disc.

9. A disc brake according to claim 8, wherein
said second arm includes
a projection in the area of and above the periphery of said disc, and said caliper is in positive engagement with said projection.

10. A disc brake according to claim 8, wherein
said caliper is in positive engagement with said fourth surface.

11. A disc brake according to claim 1, wherein
said first arm further includes a second groove disposed adjacent the other side of said disc extending parallel to said axis formed by said first surface, a sixth surface disposed on said other side of said disc perpendicular to said first surface extending from said first surface toward the center of said disc and a seventh surface disposed on said other side of said disc perpendicular to said sixth surface spaced from said first surface extending parallel to said first surface,
said second arm further includes an eighth surface disposed on said other side of said disc perpendicular to said fourth surface extending from said fourth surface toward the center of said disc, and
said other of said pair of brake shoes having a second friction lining on the surface thereof remote from said disc to frictionally engage said caliper and said other of said pair of shoes is disposed on said other side of said disc having an inwardly directed second projection on one end thereof adjacent said first arm engaging said second groove in an abutting relationship with said seventh surface and spaced from said first surface said first predetermined distance and the other end of said other of said pair of shoes being in an abutting relationship with said eighth surface and spaced from said fourth surface said second predetermined distance in said inoperative position of said brake.

* * * * *